United States Patent
Polyakov (10) Patent No.: US 10,068,205 B2
(45) Date of Patent: Sep. 4, 2018

(54) SOCIAL EVENT SCHEDULER

(71) Applicant: DELONACO LIMITED, Nicosia (CY)

(72) Inventor: Maxym Polyakov, Menlo Park, CA (US)

(73) Assignee: DELONACO LIMITED, Nicosia (CY)

( * ) Notice: Subject to any disclaimer, the term of this patent is extended or adjusted under 35 U.S.C. 154(b) by 76 days.

(21) Appl. No.: 13/954,378

(22) Filed: Jul. 30, 2013

(65) Prior Publication Data

US 2015/0039368 A1 Feb. 5, 2015

(51) Int. Cl.
*G06Q 10/00* (2012.01)
*G06Q 10/10* (2012.01)
*G06Q 50/00* (2012.01)

(52) U.S. Cl.
CPC ......... *G06Q 10/1095* (2013.01); *G06Q 50/01* (2013.01)

(58) Field of Classification Search
CPC ........................... G06Q 10/1095; G06Q 50/01
See application file for complete search history.

(56) References Cited

U.S. PATENT DOCUMENTS

| | | | | |
|---|---|---|---|---|
| 6,091,956 A * | 7/2000 | Hollenberg | ............ | G06Q 30/02 455/456.5 |
| 6,882,998 B1 * | 4/2005 | Stemp | .................. | G06K 9/6221 707/737 |
| 6,944,612 B2 * | 9/2005 | Roustant | ........... | G06F 17/30867 707/706 |
| 8,010,418 B1 * | 8/2011 | Lee | .................... | G06Q 30/0631 705/26.7 |
| 8,463,295 B1 * | 6/2013 | Caralis | ............... | G06Q 30/0631 455/414.2 |
| 8,706,406 B2 * | 4/2014 | Kalaboukis | ............. | H04W 4/02 701/423 |
| 8,719,198 B2 * | 5/2014 | Zheng | .................... | G01C 21/20 706/21 |
| 8,832,566 B2 * | 9/2014 | Wakhlu | ........................ | 715/753 |
| 9,465,857 B1 * | 10/2016 | DeLand | ............ | G06F 17/30598 |
| 2002/0115453 A1 * | 8/2002 | Poulin | ................. | G06F 17/3087 455/456.4 |
| 2003/0020623 A1 * | 1/2003 | Cao | ........................ | G01C 21/20 340/686.6 |
| 2004/0249799 A1 * | 12/2004 | Demarcken | ......... | G06F 17/3048 |
| 2005/0120105 A1 * | 6/2005 | Popescu | ................ | H04L 69/329 709/223 |
| 2006/0129843 A1 * | 6/2006 | Srinivasa | .......... | G06F 17/30699 713/189 |
| 2006/0242234 A1 * | 10/2006 | Counts | .................... | H04W 4/08 709/204 |
| 2007/0136118 A1 * | 6/2007 | Gerlach | ................. | G06Q 10/06 705/7.21 |
| 2007/0167136 A1 * | 7/2007 | Groth | .................... | G06Q 10/109 455/41.2 |
| 2007/0233635 A1 * | 10/2007 | Burfeind et al. | ................. | 707/1 |
| 2007/0233736 A1 * | 10/2007 | Xiong | .................... | G06Q 30/02 |
| 2007/0237096 A1 * | 10/2007 | Vengroff | ............... | H04W 4/029 370/254 |
| 2008/0102856 A1 * | 5/2008 | Fortescue | ............. | G06Q 30/02 455/456.1 |

(Continued)

Primary Examiner — Jonathan G Sterrett
(74) Attorney, Agent, or Firm — Georgiy L. Khayet (57) ABSTRACT

An online event scheduler system for allowing users to find events of interest in which the users can participate and to allow users to set up impromptu meeting with nearby users.

9 Claims, 6 Drawing Sheets

(56) References Cited

U.S. PATENT DOCUMENTS

| | | | |
|---|---|---|---|
| 2009/0006111 A1* | 1/2009 | Shahine et al. ................... 705/1 |
| 2009/0018995 A1* | 1/2009 | Chidlovskii ........... G06K 9/622 |
| 2009/0106304 A1* | 4/2009 | Song .................... G06K 9/6272 |
| 2009/0165022 A1* | 6/2009 | Madsen ............... G06Q 10/109 |
| | | 719/318 |
| 2010/0017371 A1* | 1/2010 | Whalin ............... G06Q 10/109 |
| | | 707/E17.014 |
| 2010/0057562 A1* | 3/2010 | Gabbay ................. G06Q 30/02 |
| | | 705/14.52 |
| 2010/0250672 A1* | 9/2010 | Vance et al. .................. 709/204 |
| 2010/0305848 A1* | 12/2010 | Stallman ............. G06F 17/3087 |
| | | 701/465 |
| 2011/0125850 A1* | 5/2011 | Rahnama ................ H04W 4/21 |
| | | 709/205 |
| 2011/0137988 A1* | 6/2011 | Balogh ................... G10L 15/26 |
| | | 709/204 |
| 2012/0136689 A1* | 5/2012 | Ickman et al. .............. 705/7.19 |
| 2012/0233557 A1* | 9/2012 | Wakhlu ................. G06F 3/0481 |
| | | 715/753 |
| 2012/0282922 A1* | 11/2012 | Fodor ..................... H04W 8/22 |
| | | 455/426.1 |
| 2012/0284637 A1* | 11/2012 | Boyer et al. .................. 715/751 |
| 2013/0035114 A1* | 2/2013 | Holden ................... H04W 4/08 |
| | | 455/456.3 |
| 2013/0097246 A1* | 4/2013 | Zifroni ................... G06Q 50/01 |
| | | 709/204 |
| 2013/0212176 A1* | 8/2013 | Koulomzin ........... G06Q 50/01 |
| | | 709/204 |
| 2014/0012918 A1* | 1/2014 | Chin ...................... G06Q 50/01 |
| | | 709/204 |
| 2014/0058778 A1* | 2/2014 | Mclarty ............. G06Q 10/1095 |
| | | 705/7.19 |
| 2014/0379520 A1* | 12/2014 | Nemery ............... G06Q 30/0631 |
| | | 705/26.7 |
| 2015/0099550 A1* | 4/2015 | Alharayeri ............. H04W 4/21 |
| | | 455/456.3 |

* cited by examiner

SOCIAL EVENT SCHEDULER

TECHNICAL FIELD

The present invention is directed to an online social event scheduler application.

DETAILED DESCRIPTION

According to certain embodiments, an online event scheduler collects data on users and events and analyzes such data to allow users to find events or find other users that are interested in meeting with each other. As non-limiting examples, according to certain embodiments, users can use such an online event scheduler to find other users with the same or similar status.

According to certain embodiments, the online event scheduler system collects information on users and events and processes such information to offer relevant events to users based on search criteria of the users.

According to certain embodiments, such an online event scheduler can be used in association with online social network applications to allow users to meet and attend events of interest. According to certain other embodiments the online event scheduler can be used as standalone application.

According to certain embodiments, system searches for events and/or finding other users with the same or similar status can be optimized and accelerated by using cluster analysis to group data.

According to certain embodiments, the system can perform searches based on the geoposition information and search criteria of the user such that the user can find events of interest and other users of interest within a pre-defined radius based on the user's location. The online event scheduler can be a mobile application or a desktop application.

According to certain embodiments, advertisements can be presented to users that use the online event scheduler and where such advertisements are based on information about the particular user and/or the information on the events and meetings that are of interest to the particular user. According to certain embodiments, paid advertising can be shown at the top of the list of advertisements to the user.

According to certain embodiments, a user of the online event scheduler can be both an organizer of events as well as a user that is searching for events to attend and/or seeking to meet with other users.

Such an online event scheduler can be used easily to search for an event or to add an event. According to certain embodiments, the event scheduler system presents an online registration form to the user to collect information related to the event. The online event scheduler system processes the collected information and organizes the processed data into groups in order to obtain relevant search results quickly for a given user that is looking for a desired type of event or meeting based on the search criteria of the user.

According to certain embodiments, the online event scheduler can help users with their search by filtering events based on interest and location of the user that is performing the search. Further, the online event scheduler includes features that inform the user of new events in which the user can easily participate.

Figure 1:
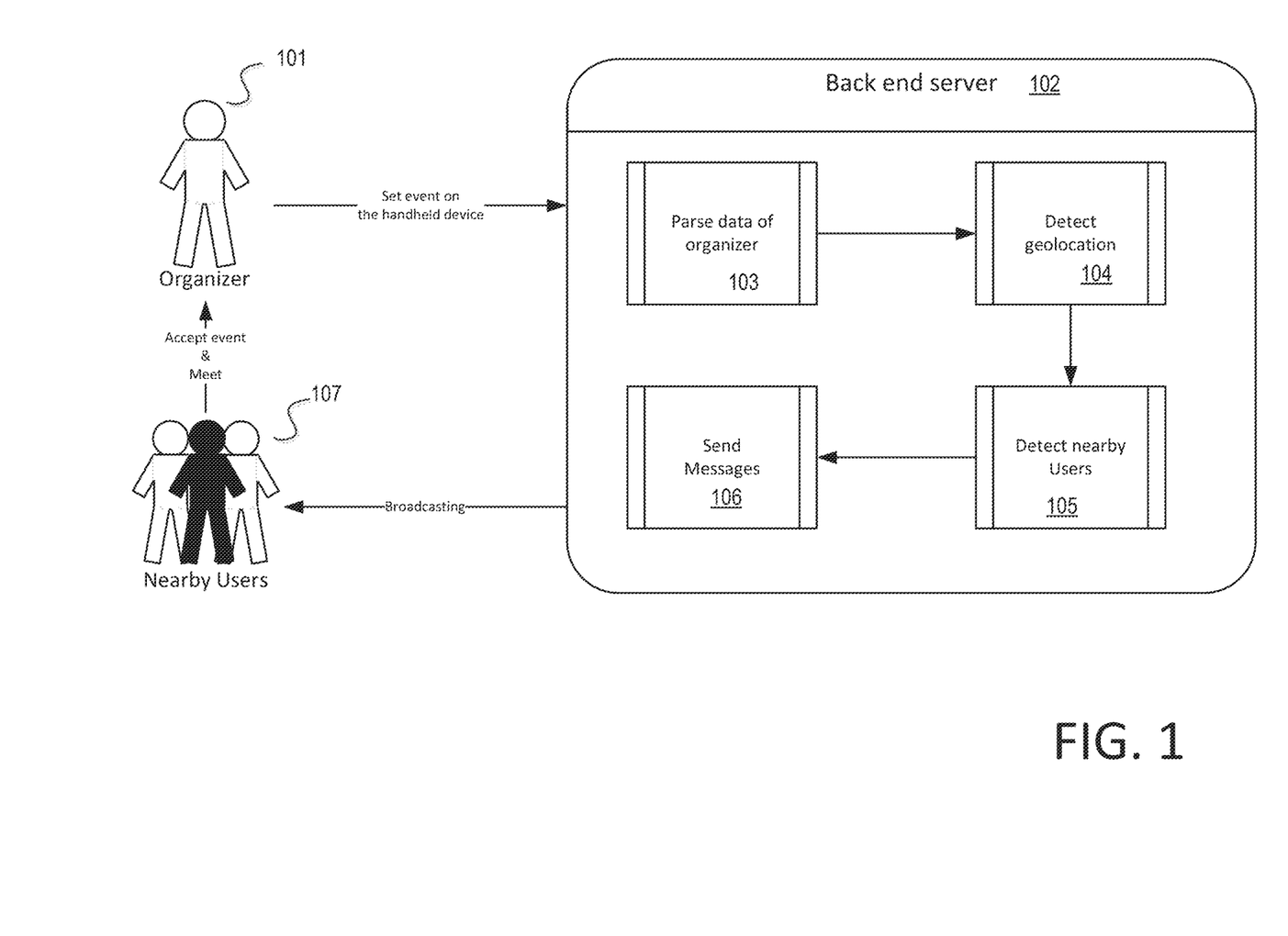
FIG. 1 illustrates high-level aspects of an online event scheduler application, according to certain embodiments.

According to certain embodiments, FIG. 1 illustrates high-level aspects of an online event scheduler application. In FIG. 1, a user that would like to organize events (organizer 101) inputs and configures information associated with a given event (the organizer's data) on the online event scheduler using a mobile device. According to certain embodiments, a backend server 102 includes a parsing functionality 103 for parsing the organizer's data, a geolocation functionality 104 for determining the geolocation of organizer 101, a user detection functionality 105 for detecting nearby users 107 that meet certain criteria, and a message functionality 106 for sending messages regarding the event to the detected nearby users 107. Those users that accept the event invitation can meet with each other and with the organizer 101. For example, for purposes of illustration, assume that a user in an organizer role (referred to as organizer in this example) would like to plan an impromptu meeting/event. Such an organizer can update her/his meeting status (e.g., "ready to meet in the next few minutes") using the event scheduler application on her/his mobile device (e.g., cell phone, tablet, etc). The event scheduler system can then broadcast the organizer's readiness to meet status to other users. The event scheduler system can determine the organizer's current geolocation. When the event scheduler system determines the organizer's geolocation, the event scheduler system can find other users that are located nearby (e.g., within a 5 to 10 minute walking distance radius from the organizer). The event scheduler system also determines which of the nearby users have a meeting status that is similar to that of the organizer. The event scheduler then sends a notification/invitation to meet (e.g., text notification) to those nearby users that have a similar meeting status to that of the organizer informing such nearby users that the organizer is ready to meet. When such nearby users ("user-receivers) receives the notification/invitation, the user-receiver can either accept or decline the invitation to meet. The user-receivers that accept the invitation to meet will obtain contact information of the organizer and/or the other information related to the event. The user-receivers can also get in touch with the organizer to discuss details of the meeting.

Figure 2:
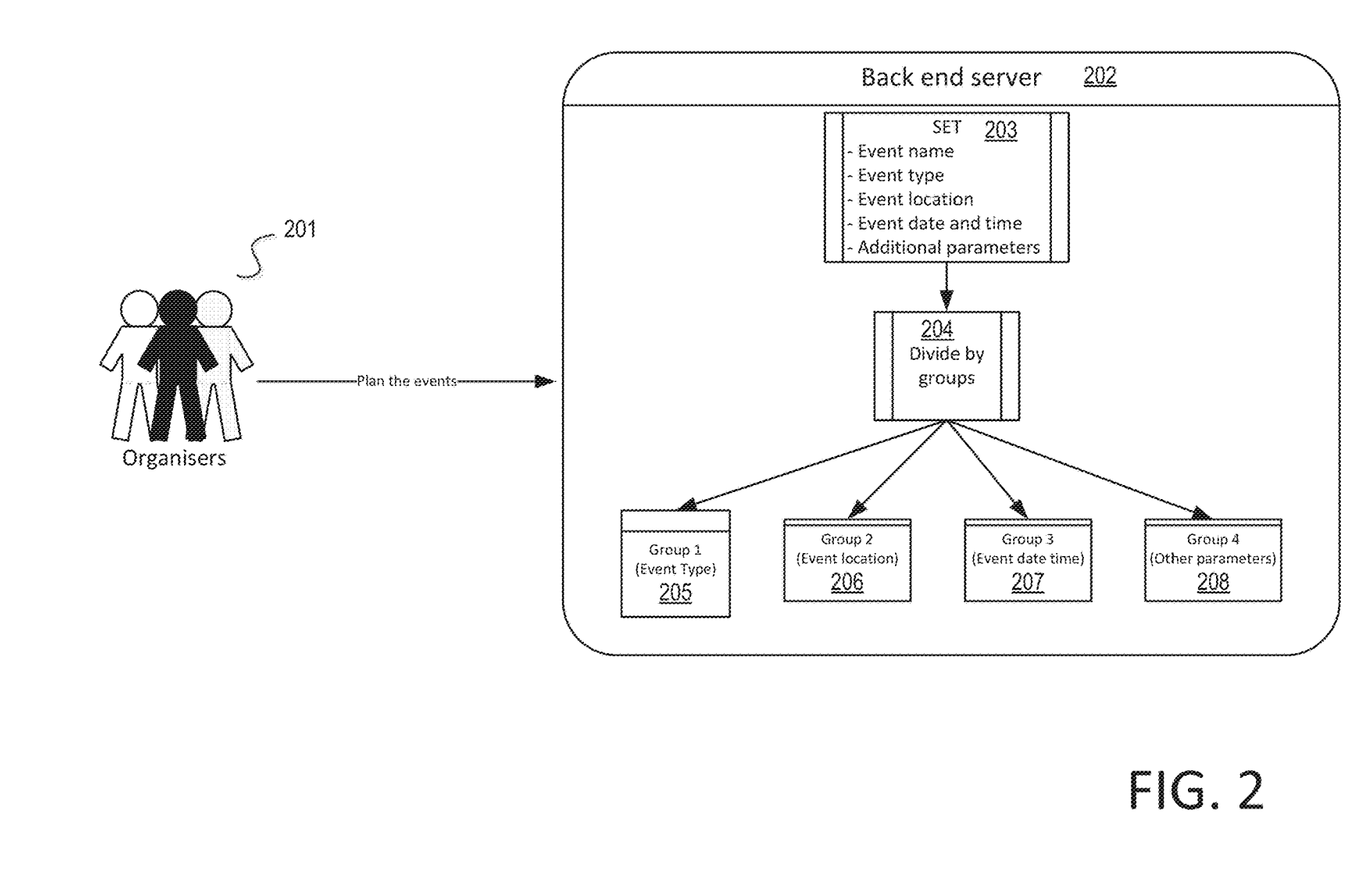
FIG. 2 illustrates high-level features of the online event scheduler system for collecting, analyzing and processing information associated with events, according to certain embodiments.

FIG. 2 illustrates high-level features of the online event scheduler system for collecting, analyzing and processing information associated with events. In FIG. 2 organizer 201 plans events by inputting a set of event information 203. At step 204, the backend server 202 that is associated with the event scheduler system analyzes and processes the data into groups such as group 1 (205), group 2 (206), group 3 (207), and group 4 (208). For example, the type of groups can be event type, event location, event data/time, and other parameters. The embodiments are not limited to the groups shown in FIG. 2. The number of groups and the type of groups can vary from implementation to implementation. The analysis of the data is further described herein with reference to FIG. 3.

Cluster analysis is used to group at least a subset of the data associated by the event scheduler system. Cluster analysis is used to optimize the storage of event data in a manner such that the information can be easily and efficiently retrieved in response to a user's search criteria when searching for events that are of interest to the user. Cluster analysis is a multivariate statistical method for sorting data into relatively similar groups. As a non-limiting example, the K-means method can be used to group objects into k clusters in such a way that the objects in a given cluster are more similar to each other than to objects in a different cluster. The similarity between objects is measured as a distance of a given object to the center of the cluster to which the given object belongs. The center of a particular cluster is determined as the mean coordinates of the objects in data space in that particular cluster.

Figure 3:
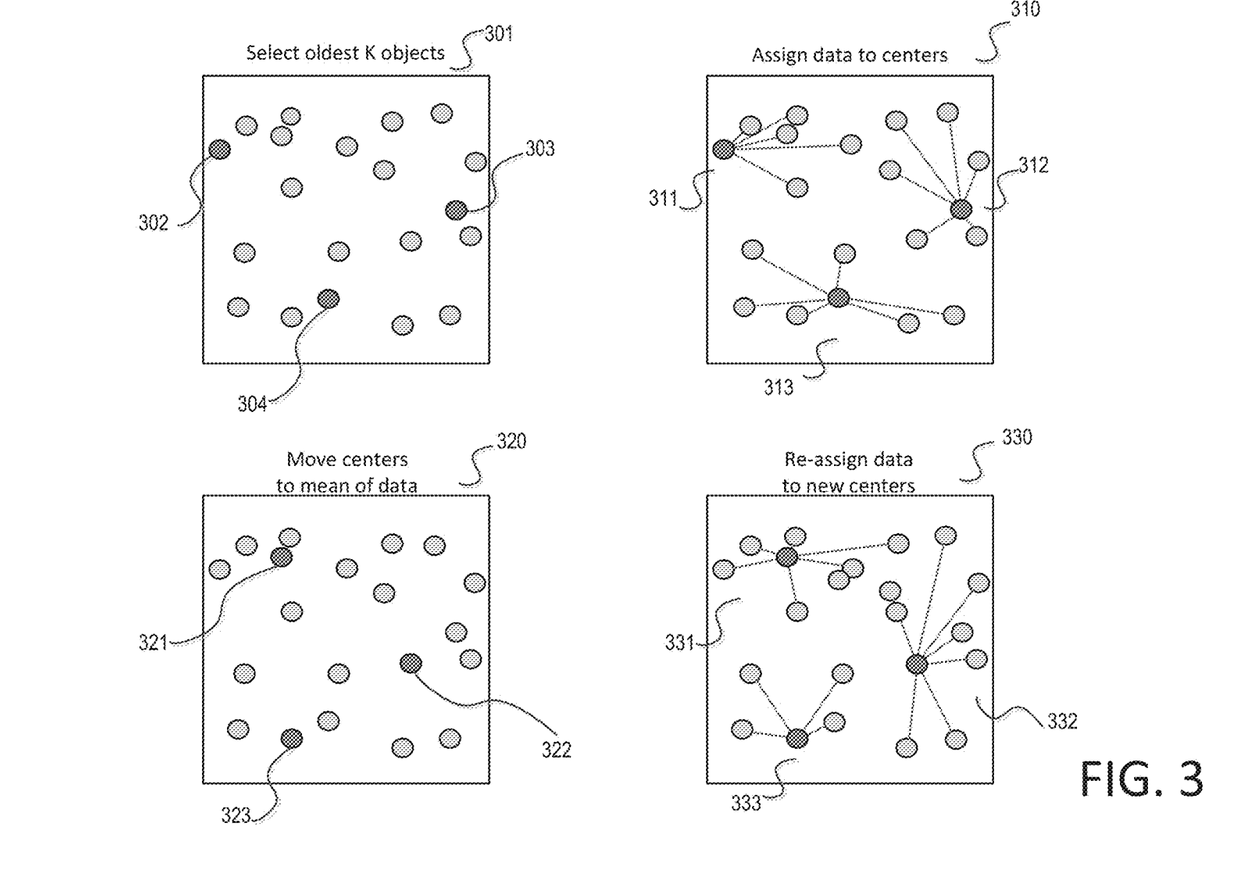
FIG. 3 illustrates high-level steps for analyzing event data using the k-means method of cluster analysis, according to certain embodiments.

FIG. 3 illustrates high-level steps for analyzing event data using the k-means method of cluster analysis. First, k objects are selected at random as shown in 301. The randomly selected objects are 302, 303 and 304. (for example, k=3). The randomly selected objects 302, 303 and 304 are used for finding centers of clusters. At 310, the remaining objects are assigned to a cluster to which they are most similar. In FIG. 3, 310 shows that the objects are grouped into three clusters 311, 312 and 313. Next, the centers of each of the clusters 311, 312 and 313 are recomputed to find a new center for each respective cluster. In FIG. 3, 320 shows the recomputed centers as 321, 322 and 323. Next at 330 in FIG. 3, the other objects are regrouped such that each given object joins one of the recomputed centers to form a cluster that is most similar to that given object. 330 at FIG. 3 shows the new clusters 331, 332 and 333. The process is repeated by recomputing the new centers for clusters 331, 332 and 333 and then regrouping the objects once again around the recomputed centers. According to certain embodiments, such a process is repeated until further iteration of computing new centers and corresponding new clusters fails to produce any change in the clusters.

According to certain embodiments, the k-means method is applied to the online event scheduler system by selecting the oldest events that are the most different from the other events as the initial clustering centers, as a first step. As a second step, the other events are then assigned to one of these initial clustering centers to form the first iteration of clusters. The afore mentioned first and second steps are repeated with each iteration until further iteration of computing new centers and corresponding new clusters fails to produce any change in the cluster in the same manner as described with reference to FIG. 3. Thus, by applying cluster analysis to the data associated with the online event scheduler system, the data can be optimized to facilitate efficient searching of events by searching only those clusters of data that are relevant to the user's search criteria rather than searching all of the data in the system.

Figure 4:
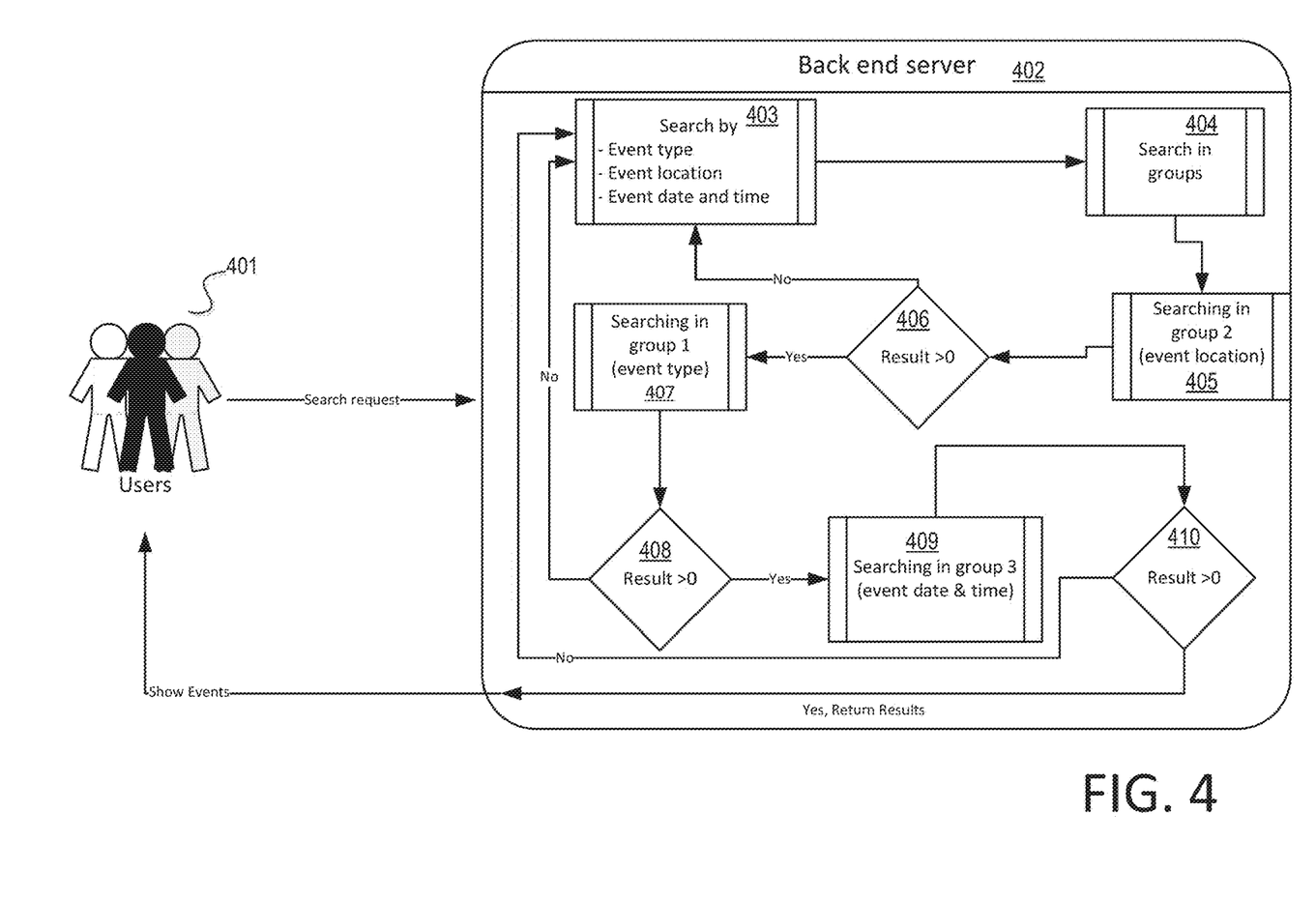
FIG. 4 shows a high-level flow chart that illustrates aspects of searching for new events in the system, according to certain embodiments.

FIG. 4 shows a high-level flow chart that illustrates aspects of searching for new events in the system. In FIG. 4, a user 401 from a plurality of users that are using the online event scheduler sends a search request for events that are of interest to user 401. For example, user 401 sends to the system, parameters that are associated with the events that are of interest to user 401. According to certain embodiments, such parameters include event type, event place or location, date and time of event. Back end server 402 performs the search by groups/clusters at step 404. For example, the groups/clusters of data can be event type group/cluster, event location group/cluster, event date group/cluster and event time group/cluster, according to certain embodiments. At step 404, the backend server 402 of the system begins the search by searching the location data group/cluster at step 405 to select data that meets the country and city of interest to the user 401. Thus, the system can ignore data that does not meet the country and city criteria of the user's search request. If at step 406, the search results from searching the location data group/cluster is determined to be not greater than zero (the system finds no results) then the user's search request is returned to search queue at step 403 for another search. If the search results from searching the location data group/cluster is greater than zero, then the search process proceeds to step 407 to search the event type data group/cluster for events that meet the event type criteria of the user's search request. If at step 408 the search results from searching the event type data group/cluster is determined to be not greater than zero (the system finds no results) then the user's search request is returned to search queue at step 403 for another search. If the search results from searching the event type data group/cluster is greater than zero, then the search process proceeds to step 409 to search the event date and time data group/cluster for events that meet the event date and time criteria of the user's search request. If at step 410 the search results from searching the event date and time data group/cluster is determined to be not greater than zero (the system finds no results) then the user's search request is returned to search queue at step 403 for another search. If the search results from searching the date and time data group/cluster is greater than zero, then the search results are presented to user 401.

According to certain embodiments, the four data type groups/clusters (event type, event place or location, date of event and time of event) are non-limiting examples of the types of groups associated with the online event scheduler system. The embodiments are not limited to such group types and can vary from implementation to implementation. The number and types of groups can vary from implementation to implementation.

According to certain embodiments, the event type data group can be characterized by duration of the event. Thus event types can comprise: 1) short-term events such as cinema, theater or restaurant events, 2) mid-term events such as excursion, resort visits, or hiking tour events, and 3) long-term or regular events such as sporting events.

According to certain embodiments, the place or location event data group determines the geographic location of a current event. The date event data group specifies the calendar date of a current event. The time event data group specifies the time of day of a current event. The date and time data are in separate data groups in order to shorten the time needed to satisfy a search query/request.

According to certain embodiments, the types of event searches using the online event scheduler can include: 1) automatic searches, 2) manual searches (standard searches), and 3) searches by geoposition.

When the standard search (manual search) by the system to satisfy the user's search criteria is not successful, one approach is to use an automatic search subsequent to the unsuccessful standard search. When the event scheduler system fails to find relevant event information during the standard search, the user's search query is sent to a queue of pending requests in the system. According to certain embodiments, the system processor launches pending requests at pre-determined intervals. For example, pending requests can be launched every hour. If no relevant event is found for a given query, then the query is again sent back to the queue of pending requests. In other words, the system continues this process in the background until a relevant event is found to satisfy the query or until the user terminates the search. If the system processor finds events that satisfy the user's search criteria, the system sends an appropriate notification about the event (event notification) to the user and the associated query or search request is deleted from the request queue and thus the automatic search is terminated with respect to this particular search request. For example, event notification can be delivered to the user by SMS, email, push notification, etc.

Figure 5:
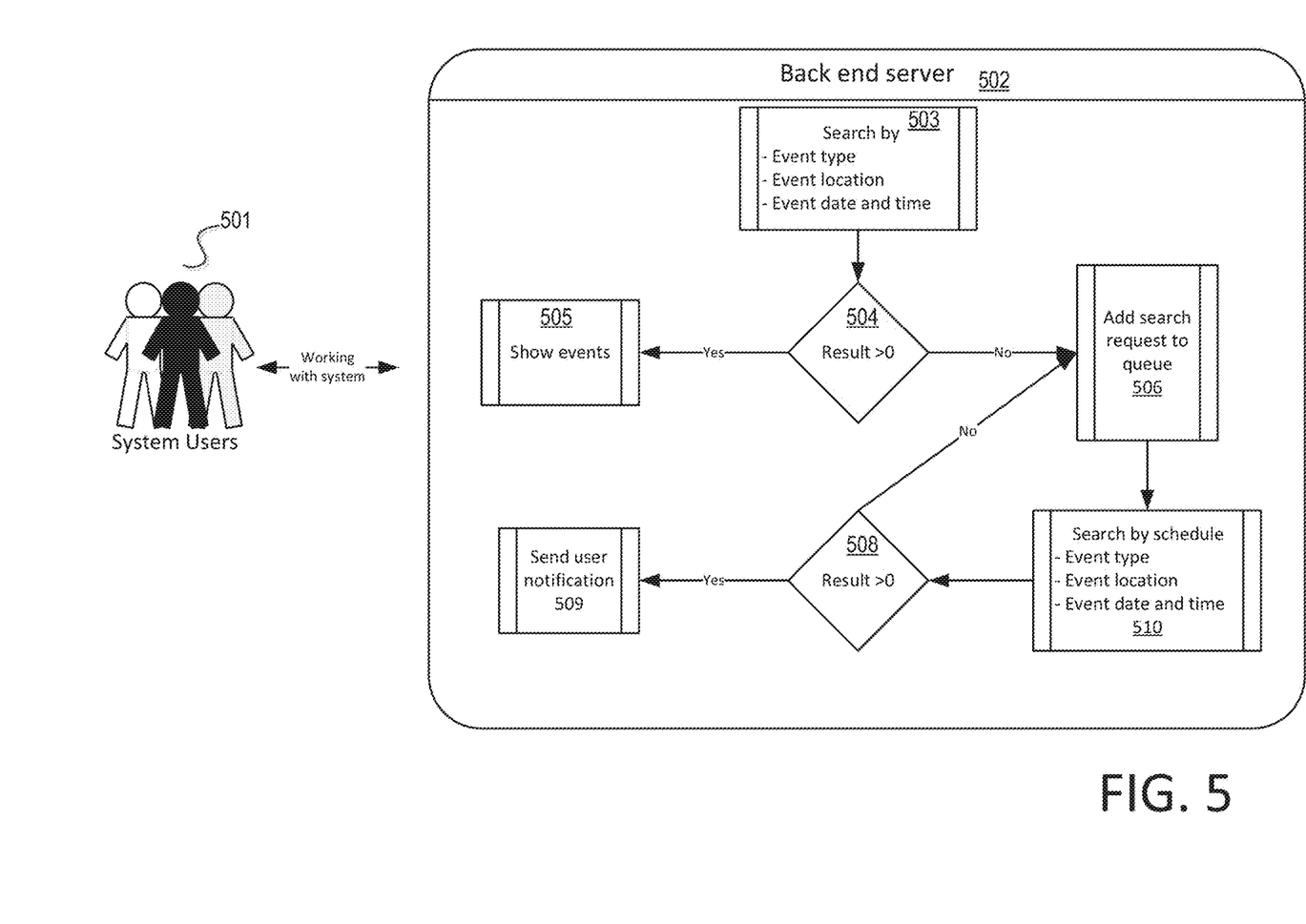
FIG. 5 is a high-level flow chart illustrating some steps that are performed during the automatic search by the system, according to certain embodiments.

FIG. 5 is a high-level flow chart illustrating some steps that are performed during the automatic search by the system. FIG. 5 shows that a user 501 of the online event scheduler system sends, via a computer or mobile device, parameters that are associated with the events that are of interest to user 501 to the system. The backend server 502 performs a search 503 as previously described herein with reference to FIG. 4 based on the information sent by user 501. At step 504, if the system finds events that meet the search criteria of user 501, then the search results are sent to user 501 at step 505. If at step 504, the system fails to find any events that meet the search criteria of user 501, then at step 506 the search request is added to pending request queue. At step 510, the processor periodically launches requests that are in the pending request queue at pre-defined intervals, for example. At step 508, if the system finds events that meet the search criteria of user 501, then the search results are sent to user 501 at step 509. If at step 508, the system fails to find any events that meet the search criteria of user 501, then at step 506 the search request is added to pending request queue again.

With respect to the manual searches (standard searches) as described herein with reference to FIG. 4, when the system finds events that meet the search criteria of a given user, such events are presented to the user. The user can then select one of the events and can ask the organizer of the event for permission to participate and/or request for detailed information on the event from the organizer.

According to certain embodiments, the system can perform searches by automatically determining the geoposition of the user that is seeking nearby users or nearby events. Information on the current location of the user can be obtained from the user's the mobile device or gps system. The system automatically obtains the geoposition information of the user and then searches for events or other users of interest within a pre-defined radius based on the user's location. As a non-limiting example, the system can find relevant events that meet the user's search criteria and that are within a radius of 10 meters to 5 kilometers from the user. The online event scheduler can be a mobile application or a desktop application.

Figure 6:
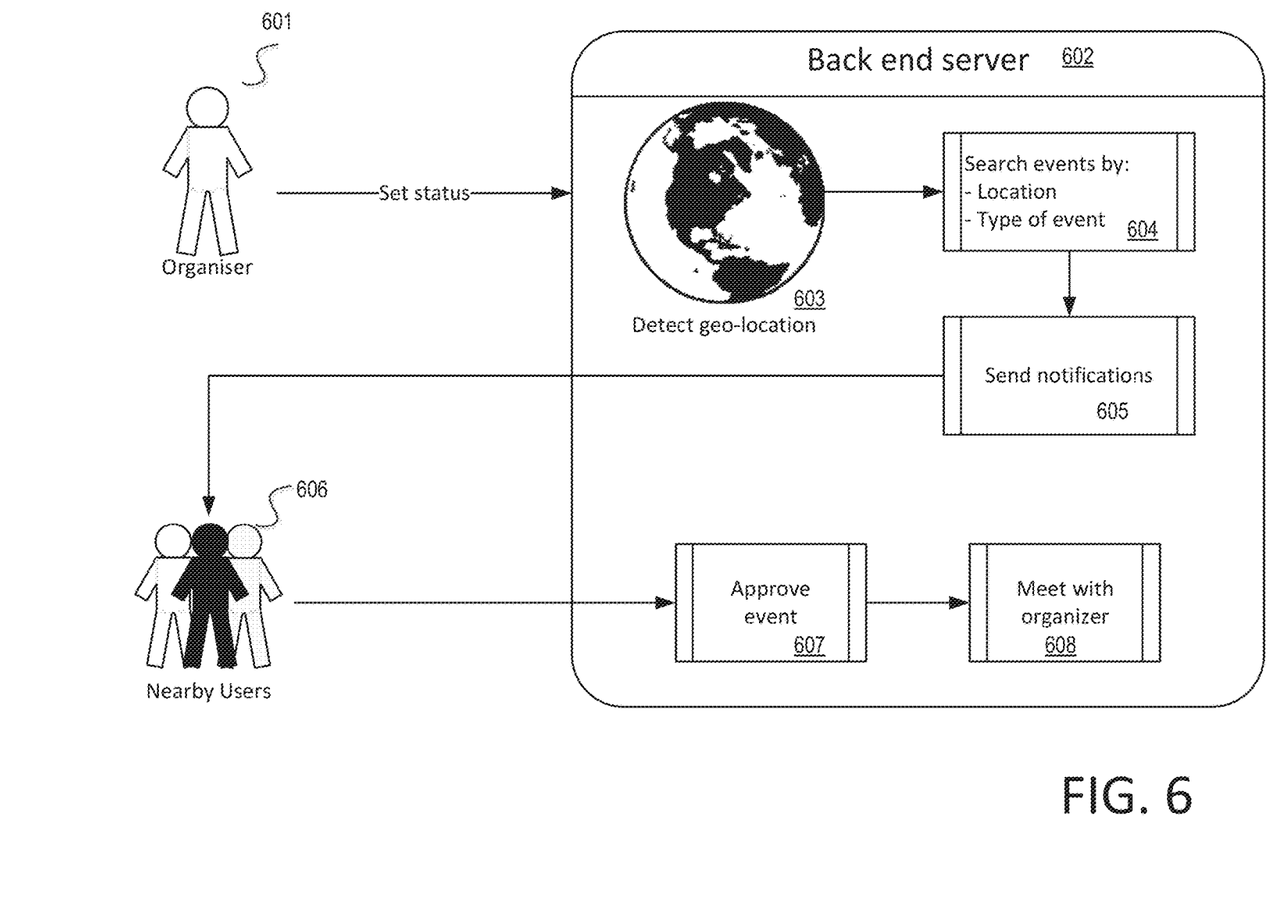
FIG. 6 is a high-level flow chart that illustrates a method for automatically determining the geoposition of the user that is seeking events, according to certain embodiments.

FIG. 6 is a high-level flow chart that illustrates a method for automatically determining the geoposition of the user that is seeking events. User/organizer 601 inputs information related to events that are of interest into the online event scheduler. At 603 the event scheduler automatically obtains the current location of the user/organizer 601. At 604, the backend server 602 of the event scheduler system searches for events/other users that meet the user/organizer's search criteria and that are near the current location of the user/organizer. At 605, the event scheduler system sends notification to nearby users 606 that the user/organizer 601 is ready to meet. At 607, the nearby users 606 have the option to consent to meet the user/organizer 601. At 608, the users can exchange information to arrange a meeting.

According to certain embodiments, the online event scheduler can present advertisements to the user based on the user profile information and or based on information associated with the event of interest. For example, if the event of interest is at a distant location from the user, the system can display relevant airline, hotel and restaurant information based on the event type and event location information.

The online event scheduler system may be a distributed computing system that comprises one or more servers and may employ distributed processes. The servers may be coupled to a communications network via a network communication module, for example. The communications network may be the Internet, but may also be any local area network (LAN) and/or wide area network (WAN). In some embodiments, one or more servers are Web servers that manage the event scheduler website. Alternatively, if servers are used within an intranet, such servers may be intranet servers. The online event scheduler system may include high speed random access memory and may also include non-volatile memory, such as one or more magnetic or optical disk storage devices. The memory may optionally include one or more storage devices remotely located from the CPU(s) of the event scheduler system. In some embodiments, the memory stores a subset or superset of the programs, modules and data structures associated with managing the online event scheduler system.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A computer method comprising:
    receiving, by a server computer system, a plurality of event postings from one or more event organizer computer systems, each event posting of the plurality of event postings including an event location, an event type, and an event date or time;
    performing, by the server computer system, a search optimization process that includes
        a. generating event-location clusters, including
            selecting a set of marker event postings of the plurality of the event postings;
            generating event-location clusters by analyzing event-location data distances between pairs of the marker event postings and non-marker event postings of the plurality of event postings and by grouping each of the non-marker event postings with one of the marker event postings selected based on the shortest event-location data distance therebetween;
            selecting an updated marker event posting within each of the event-location clusters;
            generating updated event-location clusters based on the updated marker event postings;
        b. generating event-type clusters, including
            selecting a set of marker event postings of the plurality of the event postings;
            generating event-type clusters by analyzing event-type data distances between pairs of the marker event postings and non-marker event postings of the plurality of event postings and by grouping each of the non-marker event postings with one of the marker event postings selected based on the shortest event-type data distance therebetween;

selecting an updated marker event posting within each of the event-type clusters;
generating updated event-type clusters based on the updated marker event postings;
c. generating event-date or event-time clusters, including
selecting a set of marker event postings of the plurality of the event postings;
generating event-date or event-time clusters by analyzing event-date or event-time data distances between pairs of the marker event postings and non-marker event postings of the plurality of event postings and by grouping each of the non-marker event postings with one of the marker event postings selected based on the shortest event-date or event-time data distance therebetween;
selecting an updated marker event posting within each of the event-date or event-time clusters;
generating updated event-date or event-time clusters based on the updated marker event postings;
receiving, by the server computer system from a user computer system, a search request of a user, the search request including event parameters associated with one or more events of interest to the user, wherein the event parameters include a desired event type, a desired event location, and a desired event date or time;
attempting to identify, by the server computer system, one or more updated event clusters in each of the updated event-location clusters, the updated event-type clusters, and the updated event-date or event-time clusters matching the event parameters;
searching, by the server computer system, only the identified one or more updated event clusters from each of the updated event-location clusters, the updated event-type clusters, and the updated event-date or event-time clusters for one or more event postings that matches the event parameters specified in the search request;
if no event posting is found that matches the event parameters specified in the search request, then sending, by the server computer system, the search request to a queue of pending search requests;
if one or more event postings is found that matches the event parameters specified in the search request, then presenting, by the server computer system, the one or more event postings to the user computer system;
after a time period, selecting, by the server computer system, a particular pending search request from the queue of pending search requests, and returning to the step of attempting to identify one or more updated event clusters matching the event parameters of the particular pending search request;
presenting, by the server computer system, a user interface to allow a particular event organizer computer system of the one or more event organizer computer systems to provide at least one event posting; and
setting up, by the server computer system, using the particular event organizer computer system of the one or more event organizer computer systems, impromptu meetings with users that are within a pre-determined geographical distance of the particular event organizer computer system by automatically sending the one or more event postings to event organizer computer systems associated with the users within the pre-determined geographical distance of the particular event organizer computer system based on the matching of the one or more event postings with event parameters associated with one or more events of interest to the users.

2. The computer method of claim 1, further comprising enabling the particular event organizer computer system of the one or more event organizer computer systems to provide a meeting status.

3. The computer method of claim 1, wherein event types of the plurality of event postings are differentiated based on time length of events associated with the plurality of event postings.

4. The computer method of claim 1, further comprising performing an automatic search based on a location of the particular event organizer computer system of the one or more event organizer computer systems to allow the user to set up the impromptu meetings with the users.

5. The computer method of claim 1, further comprising sending an event notification of an event posting to one or more users.

6. The computer method of claim 1, further comprising communicating with social network applications to find events and other users.

7. The computer method of claim 1, further comprising sending advertisements to the user based on the one or more events of interest to the user.

8. The computer method of claim 1, wherein the step of selecting the marker event postings includes randomly selecting the marker event postings.

9. The computer method of claim 1, wherein the step of selecting the marker event postings includes selecting the marker event postings based on old variants of event postings.

* * * * *